United States Patent
Williams

(10) Patent No.: US 10,611,607 B1
(45) Date of Patent: Apr. 7, 2020

(54) SILO MOUNTABLE RESCUE ASSEMBLY

(71) Applicant: Timothy Williams, Blanchester, OH (US)

(72) Inventor: Timothy Williams, Blanchester, OH (US)

(*) Notice: Subject to any disclaimer, the term of this patent is extended or adjusted under 35 U.S.C. 154(b) by 8 days.

(21) Appl. No.: 16/150,748

(22) Filed: Oct. 3, 2018

(51) Int. Cl.
*B66C 5/02* (2006.01)
*A62B 1/06* (2006.01)
*F16M 13/02* (2006.01)
*B66D 3/02* (2006.01)
*B66D 3/06* (2006.01)

(52) U.S. Cl.
CPC ............... *B66C 5/025* (2013.01); *A62B 1/06* (2013.01); *B66D 3/02* (2013.01); *B66D 3/06* (2013.01); *F16M 13/02* (2013.01); *B66D 2700/026* (2013.01)

(58) Field of Classification Search
CPC .. B66C 5/025; A62B 1/06; B66D 3/02; B66D 3/06; B66D 2700/026
See application file for complete search history.

(56) References Cited

U.S. PATENT DOCUMENTS

| | | | | |
|---|---|---|---|---|
| 1,215,874 A | * | 2/1917 | Scherrer | B66D 3/04 254/338 |
| 1,816,654 A | * | 7/1931 | Powers | B66C 5/025 254/322 |
| 2,465,289 A | * | 3/1949 | Sitton | F16M 11/16 248/168 |
| 2,643,856 A | | 6/1953 | Sales | |
| 4,191,416 A | * | 3/1980 | Nist | A62B 1/00 254/399 |
| 4,468,004 A | * | 8/1984 | Shaver | A62B 1/02 254/325 |
| 4,469,307 A | * | 9/1984 | Bell | B66C 5/025 248/163.2 |
| 4,597,562 A | * | 7/1986 | Joyce | B66F 19/00 254/334 |
| 4,660,679 A | * | 4/1987 | Ostrobrod | B66C 5/025 116/202 |
| 4,824,076 A | * | 4/1989 | Ward | A62B 1/14 254/254 |
| 4,997,152 A | * | 3/1991 | Wagman | B66C 5/025 248/168 |
| 5,022,489 A | * | 6/1991 | Sauber | A62B 1/00 182/145 |
| 5,150,768 A | * | 9/1992 | Olson | A62B 1/10 182/234 |
| 5,284,324 A | * | 2/1994 | Bunger | B66C 5/025 248/132 |
| 5,435,450 A | * | 7/1995 | Delcambre | B66C 1/22 213/1 R |

(Continued)

FOREIGN PATENT DOCUMENTS

FR  2936821  * 4/2010

*Primary Examiner* — Michael E Gallion

(57) ABSTRACT

A silo-mountable rescue assembly for accessing a distressed person in a silo includes a tripod that is configured to couple to a top of a silo so that an apex of the tripod is substantially centrally positioned over an opening in the silo. A block and tackle is coupled to the tripod proximate to the apex. The block and tackle is configured to lower equipment and personnel into the silo to rescue a distressed person in the silo.

13 Claims, 6 Drawing Sheets

(56) References Cited

U.S. PATENT DOCUMENTS

| | | | | |
|---|---|---|---|---|
| 5,603,488 A * | 2/1997 | O'Rourke | ............... | A62B 1/04 |
| | | | | 182/142 |
| 5,613,658 A | 3/1997 | Rogelja | | |
| 5,820,108 A * | 10/1998 | Ostrobrod | ............... | A62B 1/06 |
| | | | | 254/281 |
| 6,056,273 A * | 5/2000 | Smith | ................... | B66C 5/025 |
| | | | | 248/163.1 |
| 6,059,266 A * | 5/2000 | Ascherin | ................ | B64D 1/22 |
| | | | | 242/397.5 |
| 6,257,555 B1 * | 7/2001 | Barbara | ................. | B66D 3/14 |
| | | | | 248/163.1 |
| 6,283,455 B1 * | 9/2001 | Ascherin | ................ | B64D 1/22 |
| | | | | 242/397.5 |
| 7,036,497 B2 | 5/2006 | Horn | | |
| 7,857,288 B2 * | 12/2010 | Dunlap | ................. | B66C 5/025 |
| | | | | 254/324 |
| D730,613 S | 5/2015 | Woller | | |
| 9,314,652 B2 | 4/2016 | Broadley | | |
| 9,709,214 B2 * | 7/2017 | Wu | ...................... | F16M 13/02 |
| 2001/0032972 A1 * | 10/2001 | Fillisetti | ................ | B66C 5/025 |
| | | | | 254/334 |
| 2010/0102179 A1 * | 4/2010 | Broadley | ............... | A62B 1/06 |
| | | | | 248/157 |
| 2015/0166311 A1 * | 6/2015 | Flatterich | ............... | B66D 3/06 |
| | | | | 414/800 |
| 2015/0369421 A1 * | 12/2015 | Wu | ...................... | F16M 13/02 |
| | | | | 248/205.1 |
| 2017/0217739 A1 * | 8/2017 | Williams | ............... | B66C 13/50 |
| 2018/0265338 A1 * | 9/2018 | Motley | ................... | B66F 7/28 |
| 2018/0290868 A1 * | 10/2018 | Hall | ....................... | B66D 3/20 |

* cited by examiner

SILO MOUNTABLE RESCUE ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to rescue assemblies and more particularly pertains to a new rescue assembly for accessing a distressed person in a silo.

BRIEF SUMMARY OF THE INVENTION

An embodiment of the disclosure meets the needs presented above by generally comprising a tripod that is configured to couple to a top of a silo so that an apex of the tripod is substantially centrally positioned over an opening in the silo. A block and tackle is coupled to the tripod proximate to the apex. The block and tackle is configured to lower equipment and personnel into the silo to rescue a distressed person in the silo.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
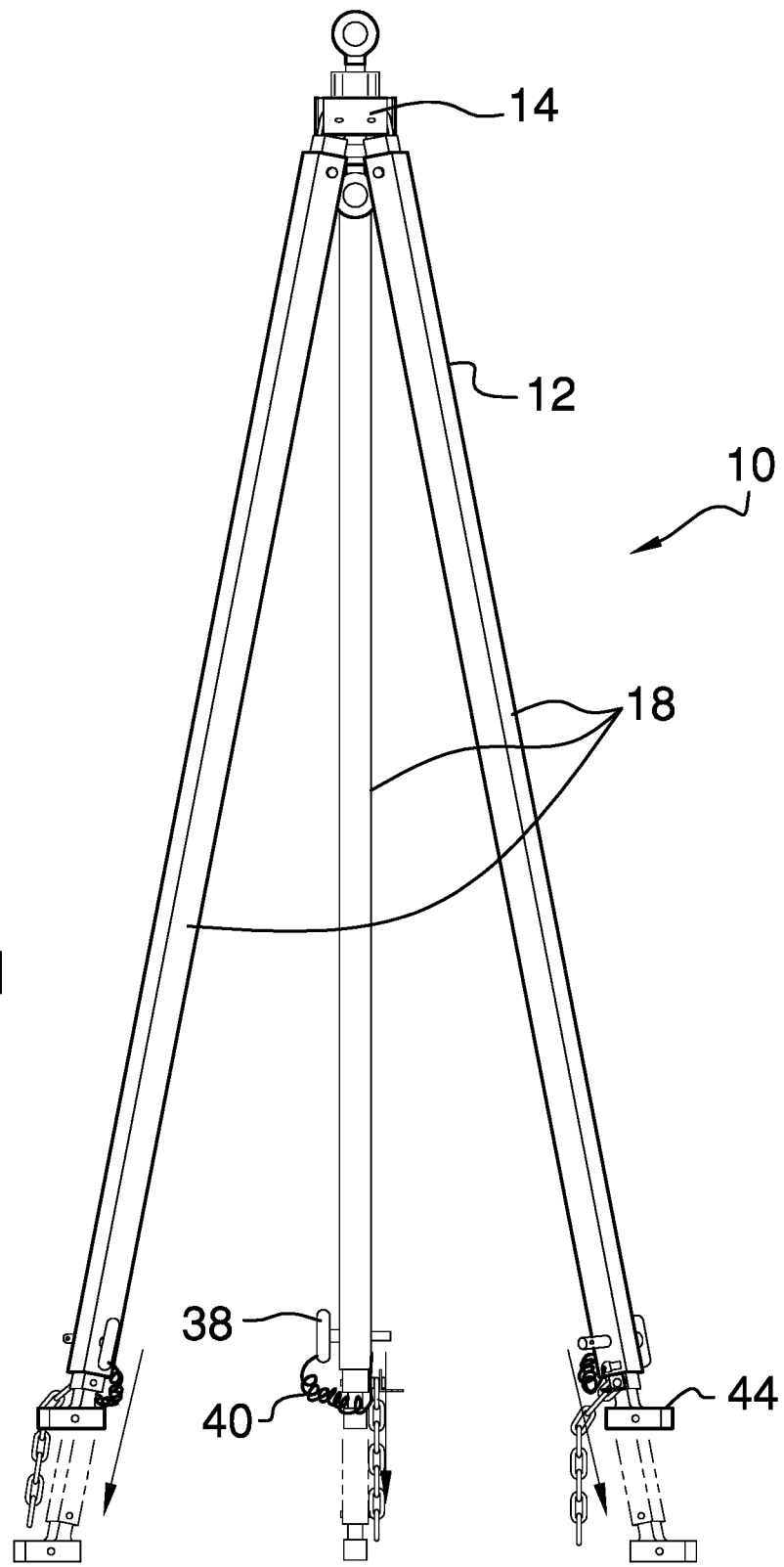
FIG. 1 is a side view of a silo-mountable rescue assembly according to an embodiment of the disclosure.

With reference now to the drawings, and in particular to FIGS. 1 through 6 thereof, a new rescue assembly embodying the principles and concepts of an embodiment of the disclosure and generally designated by the reference numeral 10 will be described.

Figure 2:
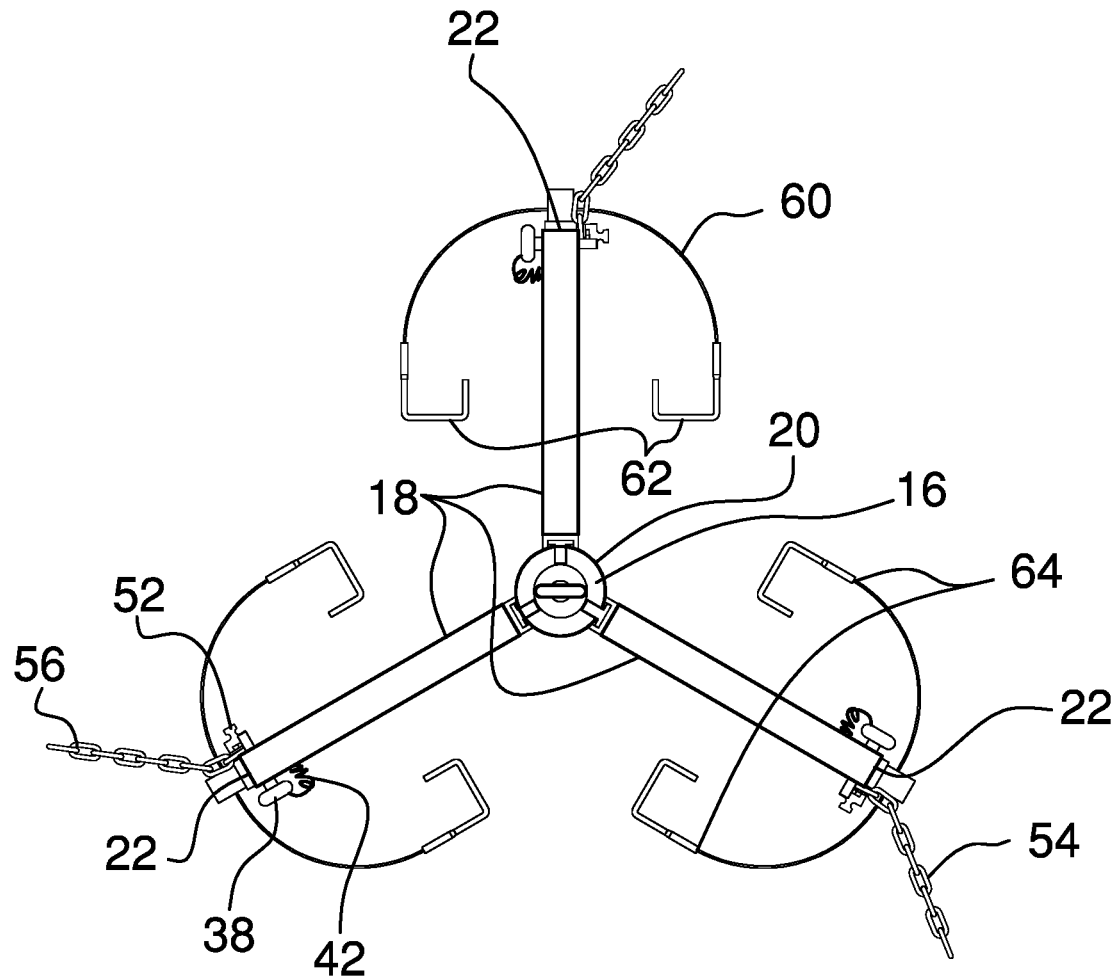
FIG. 2 is a top view of an embodiment of the disclosure.
Figure 3:
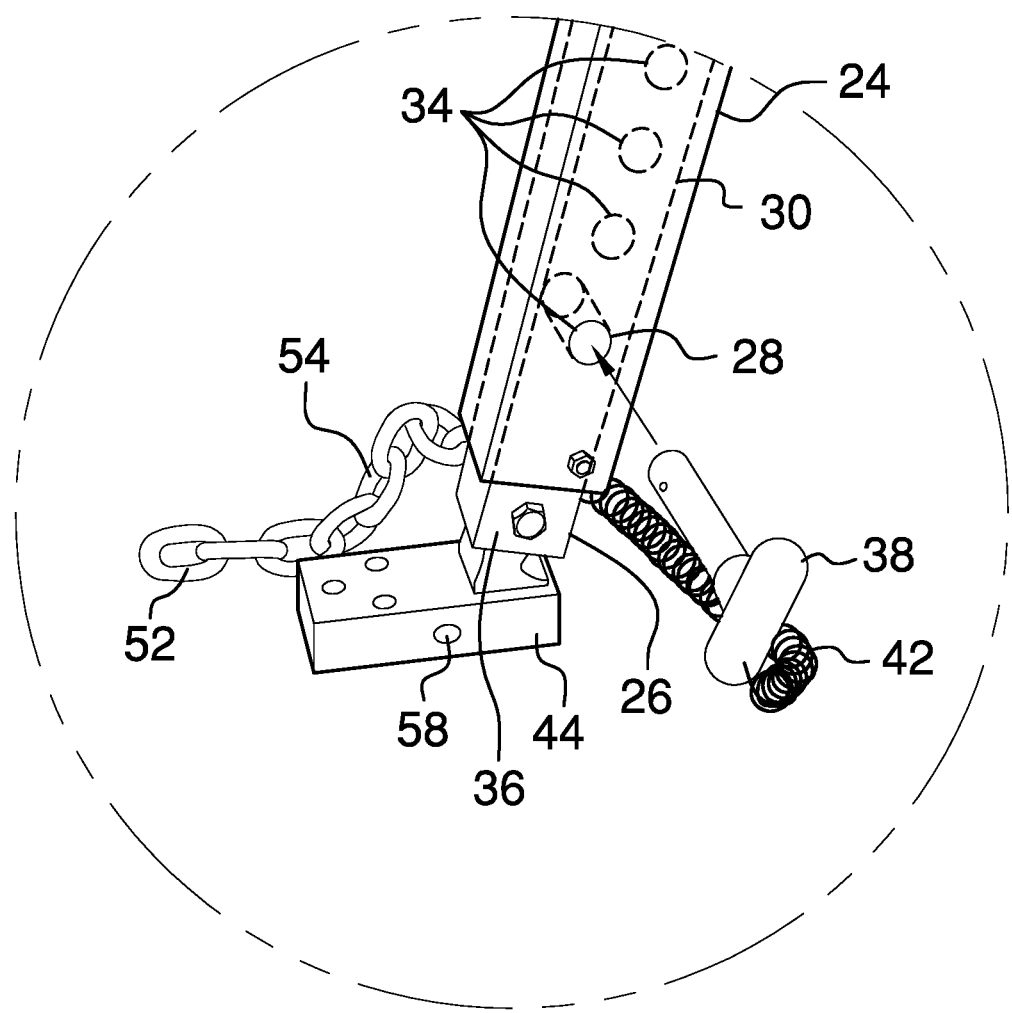
FIG. 3 is an isometric perspective view of an embodiment of the disclosure.
Figure 4:
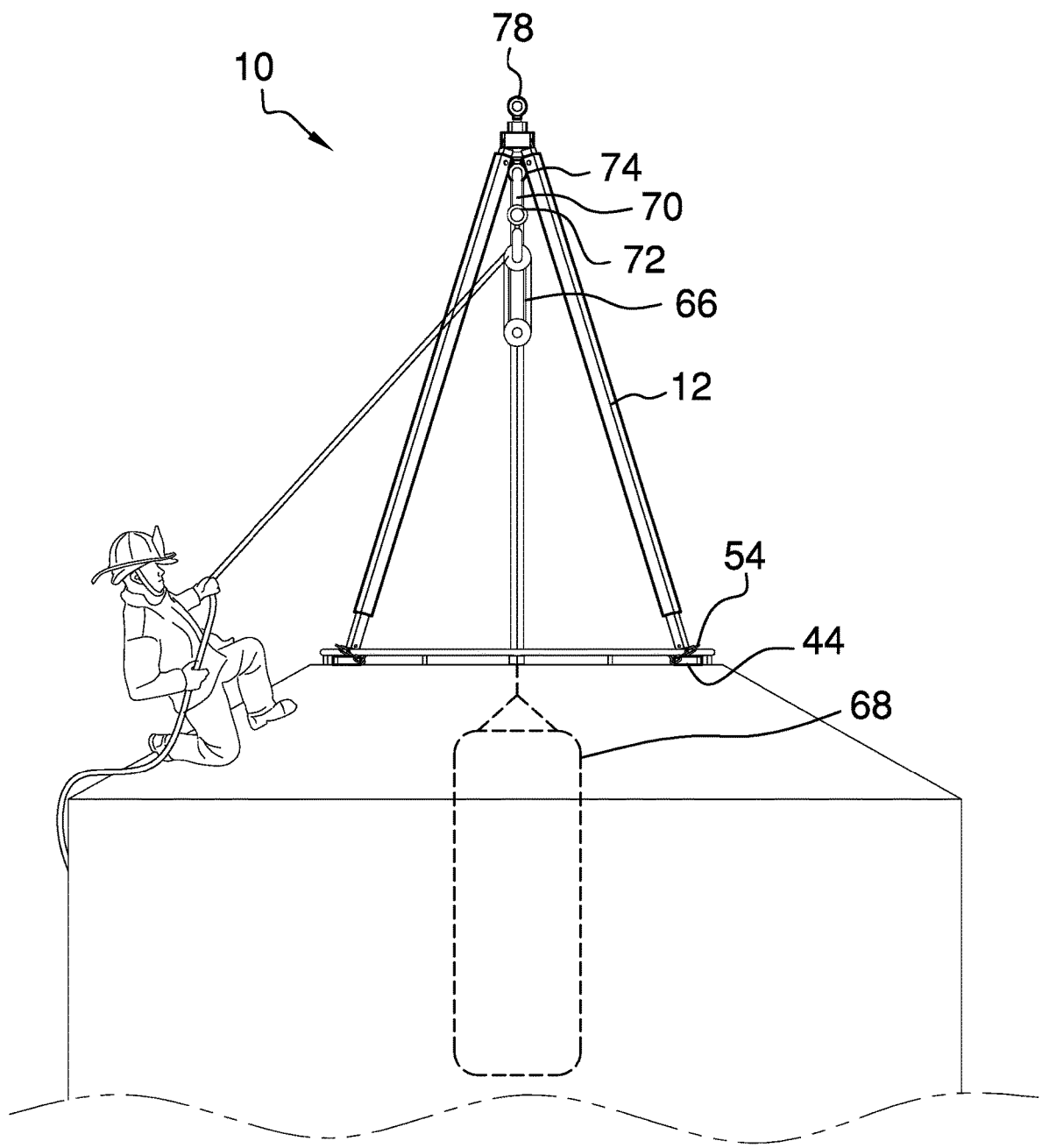
FIG. 4 is an in-use view of an embodiment of the disclosure.
Figure 5:
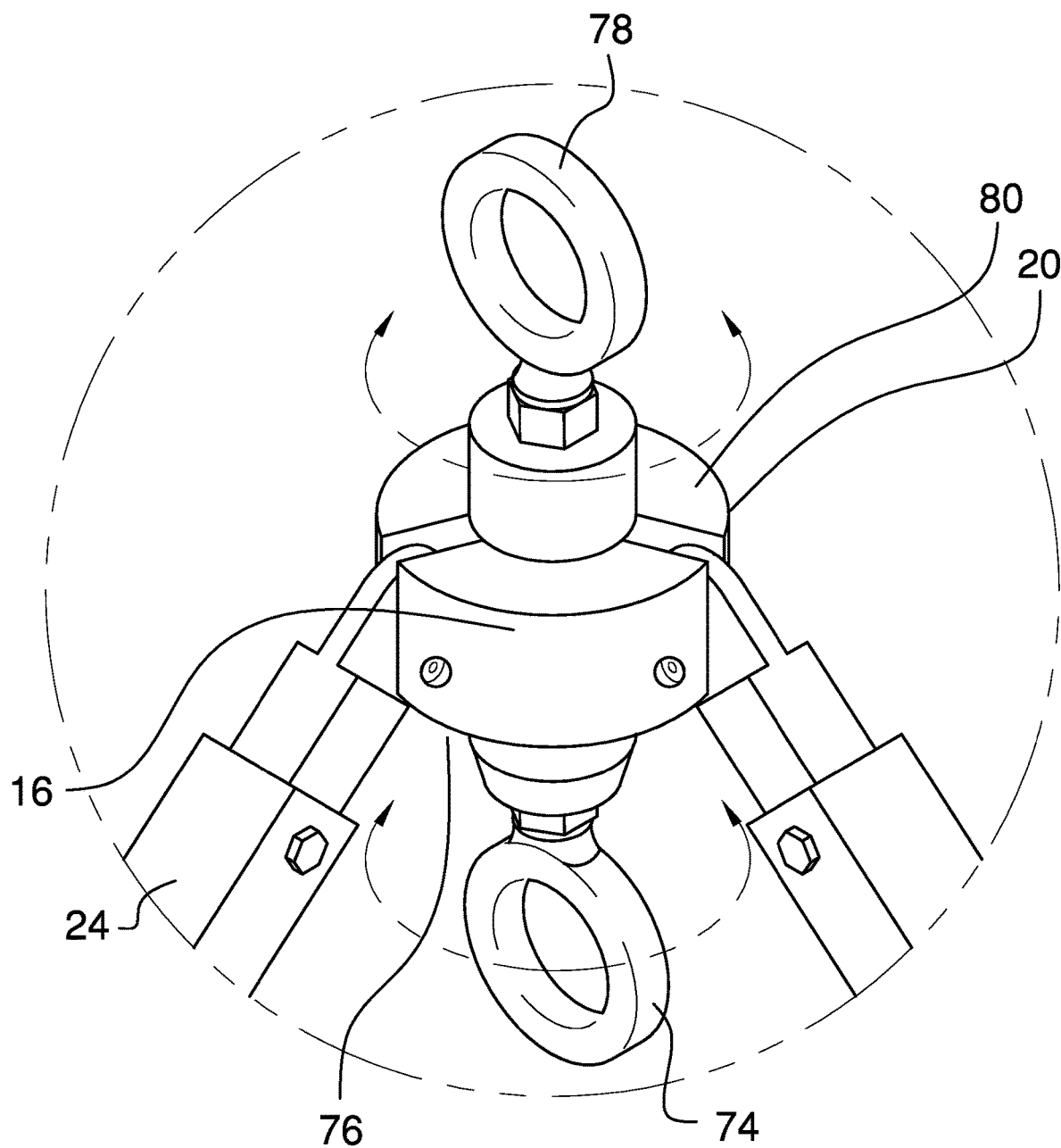
FIG. 5 is an isometric perspective view of an embodiment of the disclosure.

As best illustrated in FIGS. 1 through 6, the silo-mountable rescue assembly 10 generally comprises a tripod 12 that is configured to couple to a top of a silo so that an apex 14 of the tripod 12 is substantially centrally positioned over an opening in the silo. The tripod 12 comprises a disc 16 and a set of three rods 18. Each rod 18 is coupled to and extends transversely from a circumference 20 of the disc 16, as shown in FIG. 2. Each rod 18 has a terminus 22 distal from the disc 16. The termini 22 of the rods 18 are triangularly positioned. The rods 18 are pivotally coupled to the disc 16, as shown in FIG. 5, allowing the rods 18 to be selectively positioned in a deployed configuration, as shown in FIG. 4. The rods 18 are rectangularly shaped when viewed longitudinally.

Each rod 18 comprises an upper segment 24. A lower segment 26 is selectively extensible from the upper segment 24. A pair of first holes 28 is positioned singly in opposing sides 30 of the upper segment 24 proximate to a lower end 32 of the upper segment 24 so that the first holes 28 are aligned, as shown in FIG. 3. A plurality of pairs of second holes 34 is positioned in the lower segment 26. Each pair of second holes 34 is positioned singly in opposing faces 36 of the lower segment 26 so that the pair of second holes 34 is selectively alignable with the pair of first holes 28.

A pin 38 is selectively insertable through the pair of first holes 28 and a respective pair of second holes 34 to fixedly position the lower segment 26 relative to the upper segment 24, as shown in FIG. 3. A line 40 is coupled to and extends between the pin 38 and the upper segment 24 of the rod 18. The line 40 is positioned to retain the pin 38 in proximity to the pair of first holes 28. The line 40 comprises a retractile coil cord 42, as shown in FIG. 3, that is configured to be stretched to position the pin 38 to insert through the pair of first holes 28 and the respective pair of second holes 34.

A footing 44 is coupled to and extends from a bottom end 46 of the lower segment 26, as shown in FIG. 3. The footing 44 is configured to be positioned on a rim of the opening of the silo to stabilize the rod 18 relative to the silo. The footing 44 is pivotally coupled to the lower segment 26 so that so that the footing 44 is configured to be positioned flush to the rim of the opening, as shown in FIG. 4.

Figure 6:
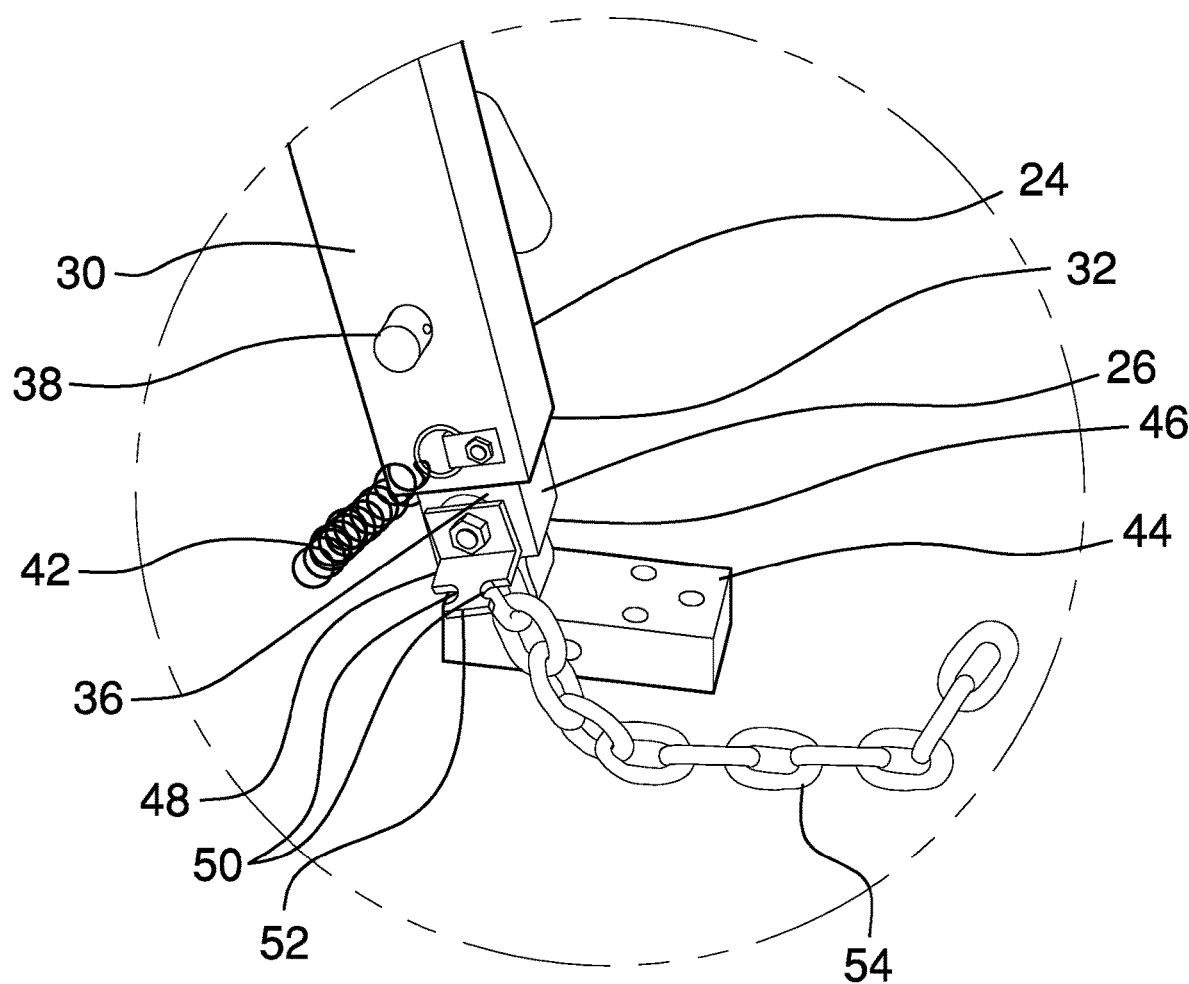
FIG. 6 is an isometric perspective view of an embodiment of the disclosure.

A plate 48 is coupled to and extends substantially perpendicularly from the lower segment 26 proximate to the bottom end 46, as shown in FIG. 6. A pair of cutouts 50 is positioned in the plate 48 to define a tab 52. A chain 54 is coupled to and extends from the lower segment 26 proximate to the bottom end 46. The chain 54 is configured to loopedly position around the perimeter ring of the silo, as shown in FIG. 4, positioning a respective link 56 of the chain 54 to insert the tab 52 to couple the chain 54 around the perimeter ring to secure the rod 18 to the silo.

A channel 58 extends through the footing 44, as shown in FIG. 3. A cable 60 is positioned through the channel 58, as shown in FIG. 2. Each of a pair of safety hooks 62 is coupled to a respective opposing end 64 of the cable 60. The safety hooks 62 are configured to hook to the rim of the opening in the silo to couple the rod 18 to the silo. The cable 60 and the safety hooks 62 would be used to couple the tripod 12 to the silo when the silo lacks the perimeter ring around the opening, or to provide a secondary safety backup to the chain 54 when the silo has the perimeter ring around the opening.

A block and tackle 66 is coupled to the tripod 12 proximate to the apex 14, as shown in FIG. 4. The block and tackle 66 is gun tackle type or the like. The block and tackle 66 is configured to lower equipment and personnel into the silo to rescue a distressed person in the silo. For example, as shown in FIG. 4, a rescue basket 68 may be lowered into the silo using the block and tackle 66 so that the distressed person can enter the rescue basket 68 and be rescued from the silo. In an event the distressed person is unconscious or otherwise incapacitated, a member of a rescue squad may be lowered to the silo using the block and tackle 66 to aid and medical attention to the distressed person.

A tackle hook 70 is coupled to an upper end 72 of the block and tackle 66. A first ring 74 is coupled to a first face 76 of the disc 16, as shown in FIG. 5. The first ring 74 is positioned to selectively insert the tackle hook 70 to couple the block and tackle 66 to the tripod 12. The first ring 74 is rotationally coupled to the disc 16.

A second ring 78 is coupled to a second face 80 of the disc 16, as shown in FIG. 5. The second ring 78 is positioned to selectively insert the tackle hook 70 to couple the block and tackle 66 to the tripod 12. The second ring 78 is rotationally coupled to the disc 16. With the rods 18 being pivotally coupled to the disc 16, either the first ring 74 or the second ring 78 can be positioned to couple to the tackle hook 70.

In use, the tripod 12 is couple to the top of the silo using the chains 54. The apex 14 of the tripod 12 is substantially centrally positioned over the opening in the silo. The tackle hook 70 of the block and tackle 66 is coupled to the first ring 74 or the second ring 78, positioning a member of a rescue squad to lower the rescue basket 68 into the silo so that the distressed person can enter the rescue basket 68 and be rescued from the silo.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A silo-mountable rescue assembly comprising:
   a tripod configured for coupling to a top of a silo such that an apex of the tripod is substantially centrally positioned over an opening in the silo, the tripod comprising:
      a disc, and
      a set of three rods, each rod being coupled to and extending transversely from a circumference of the disc, each rod having a terminus distal from the disc, the termini being triangularly positioned, each rod comprising
         an upper segment,
         a lower segment selectively extensible from the upper segment,
         a pair of first holes, the first holes being positioned singly in opposing sides of the upper segment proximate to a lower end of the upper segment such that the first holes are aligned,
         a plurality of pairs of second holes, each pair of second holes being positioned singly in opposing faces of the lower segment such that the pair of second holes is selectively alignable with the pair of first holes,
         a pin selectively insertable through the pair of first holes and a respective pair of second holes for fixedly positioning the lower segment relative to the upper segment,
         a plate coupled to and extending substantially perpendicularly from the lower segment proximate to the bottom end,
         a pair of cutouts positioned in the plate defining a tab, and
         a chain coupled to and extending from the lower segment proximate to the bottom end wherein the chain is configured for loopedly positioning around the perimeter ring of the silo positioning a respective link of the chain for inserting the tab for coupling the chain around the perimeter ring for securing the rod to the silo; and
   a block and tackle coupled to the tripod proximate to the apex wherein the block and tackle is configured for lowering equipment and personnel into the silo for rescuing a distressed person in the silo.

2. The assembly of claim 1, further including the rods being pivotally coupled to the disc.

3. The assembly of claim 1, further including the rods being rectangularly shaped when viewed longitudinally.

4. The assembly of claim 1, further including a line coupled to and extending between the pin and the upper segment of the rod wherein the line is positioned for retaining the pin in proximity to the pair of first holes.

5. A silo-mountable rescue assembly comprising:
   a tripod configured for coupling to a top of a silo such that an apex of the tripod is substantially centrally positioned over an opening in the silo, the tripod comprising:
      a disc, and
      a set of three rods, each rod being coupled to and extending transversely from a circumference of the disc, each rod having a terminus distal from the disc, the termini being triangularly positioned, each rod comprising an upper segment, a lower segment selectively extensible from the upper segment, a pair of first holes, the first holes being positioned singly in opposing sides of the upper segment proximate to a lower end of the upper segment such that the first holes are aligned, a plurality of pairs of second holes, each pair of second holes being positioned singly in opposing faces of the lower segment such that the pair of second holes is selectively alignable with the pair of first holes, a pin selectively insertable through the pair of first holes and a respective pair of second holes for fixedly positioning the lower segment relative to the upper segment, a line coupled to and extending between the pin and the upper segment of the rod wherein the line is positioned for retaining the pin in proximity to the pair of first holes, the line comprising a retractile coil cord wherein the retractile coil cord is configured for stretching for positioning the pin for inserting through the pair of first holes and the respective pair of second holes; and a block and tackle coupled to the tripod proximate to the apex wherein the block and tackle is configured for lowering equipment and personnel into the silo for rescuing a distressed person in the silo.

6. The assembly of claim 1, further including a footing coupled to and extending from a bottom end of the lower segment wherein the footing is configured positioning on a rim of the opening of the silo for stabilizing the rod relative to the silo.

7. The assembly of claim 6, further including the footing being pivotally coupled to the lower segment wherein the footing is positioned for pivoting relative to the lower segment such that the footing is configured for positioning flush to the rim of the opening.

8. The assembly of claim 6, further comprising:

a channel extending through the footing;

a cable positioned through the channel; and a pair of safety hooks, each safety hook being coupled to a respective opposing end of the cable wherein the safety hooks are configured for hooking to the rim of the opening in the silo for coupling the rod to the silo.

9. The assembly of claim 1, further including the block and tackle being gun tackle type.

10. The assembly of claim 2, further comprising:

a tackle hook coupled to an upper end of the block and tackle; and a first ring coupled to a first face of the disc wherein the first ring is positioned for selectively inserting the tackle hook for coupling the block and tackle to the tripod.

11. The assembly of claim 10, further including a second ring coupled to a second face of the disc wherein the second ring is positioned for selectively inserting the tackle hook for coupling the block and tackle to the tripod.

12. The assembly of claim 11, further including the first ring and the second ring being rotationally coupled to the disc.

13. A silo-mountable rescue assembly comprising:

a tripod configured for coupling to a top of a silo such that an apex of the tripod is substantially centrally positioned over an opening in the silo, the tripod comprising:

a disc, and a set of three rods, each rod being coupled to and extending transversely from a circumference of the disc, each rod having a terminus distal from the disc, the termini being triangularly positioned, the rods being pivotally coupled to the disc, the rods being rectangularly shaped when viewed longitudinally, each rod comprising:

an upper segment, a lower segment selectively extensible from the upper segment, a pair of first holes, the first holes being positioned singly in opposing sides of the upper segment proximate to a lower end of the upper segment such that the first holes are aligned, a plurality of pairs of second holes, each pair of second holes being positioned singly in opposing faces of the lower segment such that the pair of second holes is selectively alignable with the pair of first holes, a pin selectively insertable through the pair of first holes and a respective pair of second holes for fixedly positioning the lower segment relative to the upper segment, a line coupled to and extending between the pin and the upper segment of the rod wherein the line is positioned for retaining the pin in proximity to the pair of first holes, the line comprising a retractile coil cord wherein the retractile coil cord is configured for stretching for positioning the pin for inserting through the pair of first holes and the respective pair of second holes, a footing coupled to and extending from a bottom end of the lower segment wherein the footing is configured positioning on a rim of the opening of the silo for stabilizing the rod relative to the silo, the footing being pivotally coupled to the lower segment wherein the footing is positioned for pivoting relative to the lower segment such that the footing is configured for positioning flush to the rim of the opening, a plate coupled to and extending substantially perpendicularly from the lower segment proximate to the bottom end, a pair of cutouts positioned in the plate defining a tab, a chain coupled to and extending from the lower segment proximate to the bottom end wherein the chain is configured for loopedly positioning around the perimeter ring of the silo positioning a respective link of the chain for inserting the tab for coupling the chain around the perimeter ring for securing the rod to the silo, a channel extending through the footing, a cable positioned through the channel, and a pair of safety hooks, each safety hook being coupled to a respective opposing end of the cable wherein the safety hooks are configured for hooking to the rim of the opening in the silo for coupling the rod to the silo;

a block and tackle coupled to the tripod proximate to the apex wherein the block and tackle is configured for lowering equipment and personnel into the silo for rescuing a distressed person in the silo, the block and tackle being gun tackle type;

a tackle hook coupled to an upper end of the block and tackle;

a first ring coupled to a first face of the disc wherein the first ring is positioned for selectively inserting the tackle hook for coupling the block and tackle to the tripod, the first ring being rotationally coupled to the disc; and a second ring coupled to a second face of the disc wherein the second ring is positioned for selectively inserting the tackle hook for coupling the block and tackle to the tripod, the second ring being rotationally coupled to the disc.

\* \* \* \* \*